April 29, 1941.   D. F. ALEXANDER ET AL   2,239,804
ELECTRICAL APPARATUS
Original Filed March 4, 1937
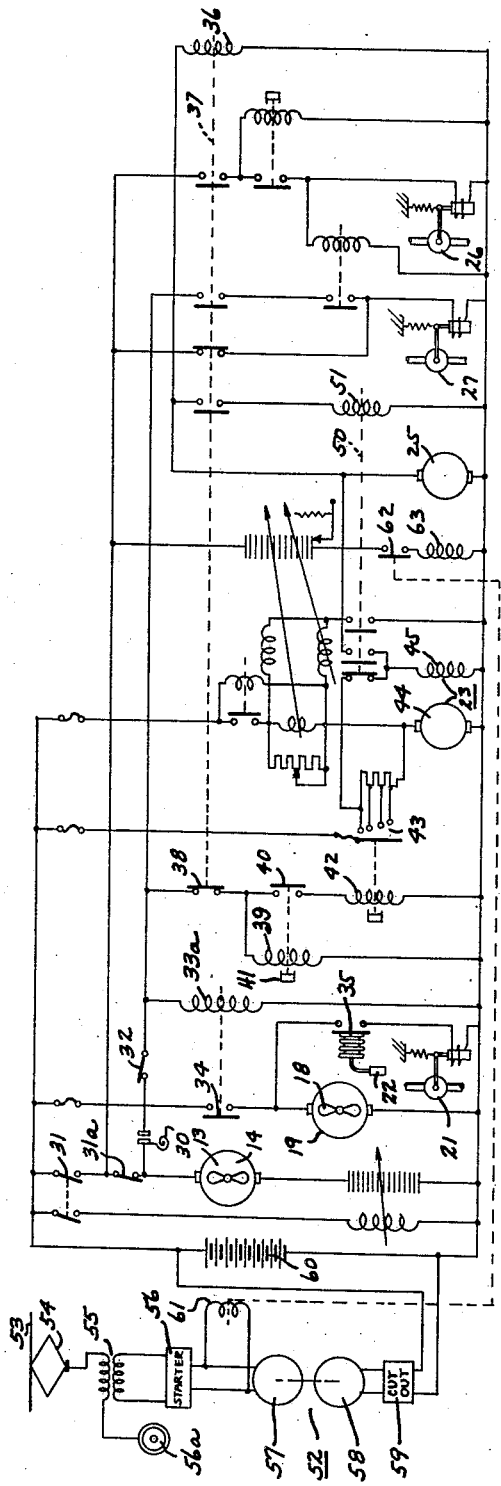
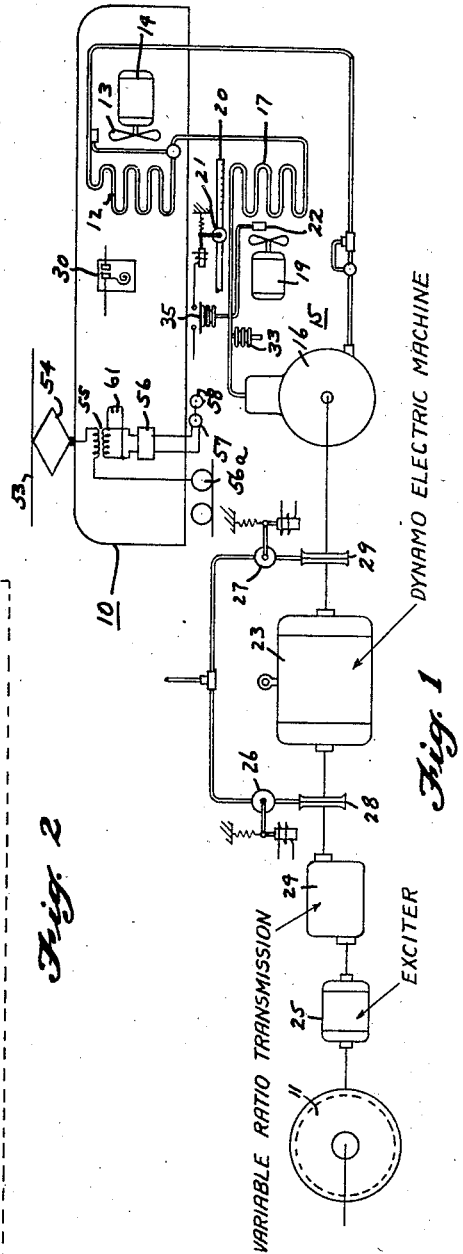
INVENTORS
Donald F. Alexander
Charles H. Kenney
Charles F. Paulus
Spencer, Hardman & Fehr
ATTORNEYS Patented Apr. 29, 1941

2,239,804

UNITED STATES PATENT OFFICE 2,239,804

ELECTRICAL APPARATUS

Donald F. Alexander, Charles F. Henney, and Charles L. Paulus, Dayton, Ohio, assignors to General Motors Corporation, Dayton, Ohio, a corporation of Delaware Original application March 4, 1937, Serial No. 129,024. Divided and this application August 20, 1937, Serial No. 160,148

2 Claims. (Cl. 171—313)

This invention relates to refrigeration, and more particularly to the conditioning of air in railway cars or the like. This application is a division of our copending application Serial No. 129,024, filed March 4, 1937, now Patent No. 2,104,382, and is a continuation in part of our copending application Serial No. 118,816, filed January 2, 1937, now Patent No. 2,104,148.

In our copending application, Serial No. 118,816, we have disclosed the conditioning of air by a refrigerant which is circulated by a compressor and in which a dynamo-electric machine and the compressor are driven from the live axle assembly of the car. The dynamo-electric machine, as a motor, drives the compressor, when refrigeration is required at a first low car speed zone. During a second car speed zone, the live axle assembly drives the compressor and may also drive the dynamo-electric machine, to produce refrigeration when required and, if desired, to generate and charge the battery when refrigeration is not required. During a third and highest car speed zone, the live axle assembly drives the dynamo-electric machine, as a generator, to charge the battery and also drives the compressor if refrigeration is required in such a manner that both the compressor and dynamo-electric machine may be driven at the same time. Reference is hereby made to the said copending application Serial No. 118,816 for further disclosure thereof.

The foregoing system is particularly advantageous where the car is hauled by any type of locomotive, such as a steam locomotive, since the entire system is a unitary structure within the car and is independent of the type of locomotive. Occasionally, however, a car may be hauled during a part of a run by a steam locomotive, and during another part of the run it may be hauled by a locomotive or car which is electrically energized either from an overhead wire system or by electrical power derived from an internal combustion engine and generator on the locomotive. The present invention permits a portion of the air conditioning system and/or the battery charging system to be directly connected to the outside source of electrical energy which drives the locomotive or car and thus removes a certain amount of tractive load from the wheels of the car. This is particularly desirable because the tractive power of electric locomotives or cars falls off rapidly at high speeds and it is desirable to reduce the tractive load therefrom. This improvement is also adapted for use when outside electrical energy is available only at the station, as for "stand by" service.

In the preferred modification of our invention, a separate dynamo-electric machine unit or similar current rectifying or voltage reducing device automatically is started whenever the outside or tractive electrical source of power is available, and this additional dynamo-electric machine or device not only charges the battery of the car, but also furnishes power to drive the original dynamo-electric machine disclosed in our copending application Serial No. 118,816 so that it acts as a motor to drive the compressor as long as the outside or tractive electrical source of power is available.

Further objects and advantages of the present invention will be apparent from the following description, reference being had to the accompanying drawing, wherein a preferred form of the present invention is clearly shown.

In the drawing:

Fig. 1 is a diagrammatic representation of an air conditioning system as applied to a railway car in which a current rectifying or voltage modifying device is provided; and Fig. 2 is a diagrammatic representation of the wiring system for the apparatus shown in Fig. 1, together with the necessary cooperating parts disclosed in our copending application, Serial No. 118,816.

Referring to Fig. 1, a railway car 10 is provided with a live axle assembly 11 which may include one or more axles of the car. The car 10 is provided with a compartment to be cooled. For this purpose, an evaporator 12 is provided over which a current of air is blown by means of a fan 13 driven by a motor 14. The refrigerant for the evaporator 12 is circulated or liquefied by the refrigerant circulating or liquefying unit 15 preferably comprising a compressor 16 and condenser 17. Air is blown over the condenser 17 by means of the fan 18 driven by the motor 19. On abnormally warm days, water is sprayed over the condenser 17 by means of the spray device 20 under the control of the valve 21 which is actuated by the thermostatic bulb 22. Water for the spray device 20 is provided by a tank under pneumatic pressure derived from the air-brake system of the car.

*Operation of system of Figs. 1 and 2 when outside electrical energy is not available*

The arrangement is such that the live axle assembly 11 drives the compressor 16 together with a dynamo-electric machine 23. Preferably an automatic variable ratio transmission 24 is provided which automatically delivers a substantially constant drive speed to the compressor and dynamo-electric machine after the car has attained a predetermined speed limit. If desired, an exciter 25 is driven proportionally to the car speed, and this exciter is used not only to excite generating field of the dynamo-electric machine but also to control the devices which are responsive to car speed, such as the pneumatic valves 26 and 27 which control the clutches 28 and 29.

The refrigerating output of the system is controlled by an automatic switch 30 which may be made responsive to any condition of air such as the dry bulb temperature, wet bulb temperature, relative humidity or the like either within the car or outside the car or both.

Fig. 2 shows the wiring diagram for the system. When air conditioning is desired, the switches 31 and 31a are manually closed and start the motor 14 which drives the fan 13. During a first car speed zone, such as when the car is standing or is moving at a relatively low speed, such as below 15 m. p. h. the dynamo-electric machine 23, as a motor, drives the compressor 16 if refrigeration is required under the control of switch 30. The switch 32 is normally closed since it is opened only in case of abnormal head pressure by the bellows 33. The switch 32 being closed, the solenoid 33a closes switch 34 and starts the motor 19 which actuates the condenser fan 18. If it is abnormally warm, thermostatic bulb 22 closes the switch 35 which opens the valve 21 and sprays water over the condenser. The exciter 25 does not have a sufficient voltage to cause the solenoid 36 to actuate the arm 37 and hence the switch 38 is closed. This energizes the solenoid 39 which closes the switch 40 with a time delay device 41. The closing of switch 40 energizes solenoid 42 which in turn sequentially closes the contacts 43 and places the armature 44 of dynamo-electric machine 23 across the battery. The motor field 45 is simultaneously placed across the battery. Before the dynamo-electric machine can be started, the solenoid valve 27 is energized and closes the clutch 29 so that the dynamo-electric machine does not start as a motor without a load but is connected to the compressor.

At the next car speed zone, which may be between 15 and 30 m. p. h., the voltage of the exciter is sufficient to energize solenoid 36 enough to move the contact arm 37 to the right. This movement so arranges the parts that the live axle assembly 11 can drive the compressor 16, if refrigeration is required, but the dynamo-electric machine 23 is prevented from generating, as more fully expained in our copending application, Serial No. 118,816. At the third, or highest, car speed zone, the voltage of the exciter is sufficiently high to actuate the contact arm 50 by means of the solenoid 51, and this changes the dynamo-electric machine into a generator, the field 45 being energized by the exciter 25. The arrangement is such that the compressor is driven from the live axle assembly when refrigeration is required, and the dynamo-electric machine is driven as a generator at all times during this highest car speed.

The foregoing operation is more fully described in our copending application Serial No. 118,816, and reference is made thereto, if necessary, for a more detailed description thereof.

*Operation of system when outside electrical energy is available*

In accordance with the modification shown in Figs. 1 and 2 of this application, when outside electrical energy is available, an electrical energy rectifying or voltage reducing unit 52 is automatically connected into the system so that the battery is charged by the unit 52 and the dynamo-electric machine 23 acts only as a motor to drive the compressor when refrigeration is required. For example, when the train arrives at that portion of the line where an overhead wire system 53 is provided, the connector 54 is elevated into position. The primary of the transformer 55 is connected to the ground or axle 56a and the wire 53 to induce relatively low tension A. C. current in the secondary coil. This latter current passes through an A. C. motor starter 56 and drives the A. C. motor 57 of the unit 52. The motor 57 drives the low voltage generator 58 which is connected, through the automatic battery cut-out 59, to both sides of the battery 60. The battery cut-out 59 automatically connects the generator 58 with the battery when the generator 58 operates and disconnects it when it is idle. Current or power is thus provided for charging the battery 60 and is made available to drive the compressor through dynamo-electric machine 23 as a motor under the control of switch 30 as previously described. When the connector 54 is elevated the solenoid 61 is energized and opens the switch 62. This opens the circuit to the exciter field 63 and prevents the exciter 25 from generating any current thus placing the wiring diagram in the equivalent position of zero car speed. Under these conditions, a dynamo-electric machine 23 drives the compressor 16, under the control of automatic switch 30, at all car speeds and the dynamo-electric machine 23 is rendered incapable of acting as a generator.

While we have shown the terminals 54 and 56a specifically connected to an overhead wire and to a rail, these may be connected to any other source of outside electrical energy, such as an electrical source on a Diesel engine-generator type of locomotive, or a source of electrical energy at a station.

For purposes of illustration, we have shown the outside source of electrical energy as being an overhead wire such as 53. However, it is to be understood that the outside supply of current may be supplied by other means such as those more fully described in Patent No. 2,104,382, of which this application is a division.

Reference is hereby made to Patent No. 2,104,382, of which this application is a division, for a disclosure of additional modifications.

While the form of embodiment of the invention as herein disclosed, constitutes a preferred form, it is to be understood that other forms might be adopted, all coming within the scope of the claims which follow.

What is claimed is as follows:

1. In a vehicle; a live axle assembly; a unitary dynamo-electric machine; a battery; torque transmitting means from said live axle assembly to said dynamo-electric machine; control means, automatically responsive to vehicle running conditions, to cause said dynamo-electric machine, to act as a motor energized from said battery, to motor independently of said live axle assembly when said vehicle is standing and, when said vehicle is in motion, to cause said live axle assembly to drive, through said torque transmitting means, said dynamo-electric machine, said dynamo-electric machine arranged to act as a generator to charge said battery, a source of outside alternating current, a current-changing device connectible to said source of outside electrical current, connecting means for connecting said source to said current-changing device and for connecting said current-changing device to said battery and dynamo-electric machine, and means for modifying said control means when said current-changing device is operating to cause said dynamo-electric machine to act as a motor when said car is in motion.

2. In a vehicle; a live axle assembly; a unitary dynamo-electric machine; a battery; torque transmitting means from said live axle assembly to said dynamoelectric machine; control means, automatically responsive to vehicle running conditions, to cause said dynamo-electric machine, to act as a motor energized from said battery to motor independently of said live axle assembly when said vehicle is running below a certain speed limit and, when said vehicle is running above a certain speed limit, to cause said live axle assembly to drive, through torque transmitting means, said dynamo-electric machine, said dynamo-electric machine arranged to act as a generator to charge said battery, a source of outside electrical energy, a motor, means for energizing said motor from said source, a generator driven by said motor, and additional control means responsive to the connection of said source to said motor to connect said generator to said battery and dynamo-electric machine and to cause said dynamo-electric machine to operate as a motor.

CHARLES F. HENNEY.
DONALD F. ALEXANDER.
CHARLES L. PAULUS.